United States Patent [19]
Sexton et al.

[11] Patent Number: 4,869,072
[45] Date of Patent: Sep. 26, 1989

[54] PARTIALLY FROZEN BEVERAGE DISPENSING SYSTEM HAVING A COUNTER TOP UNIT

[75] Inventors: Rodney N. Sexton, Laguna Hills; Floyd S. Woolf, Lake Matthews; Timothy W. Ruud, Laguna Hills, all of Calif.

[73] Assignee: ICEE-USA Corporation, Anaheim, Calif.

[21] Appl. No.: 192,235

[22] Filed: May 9, 1988

[51] Int. Cl.$^4$ .............................................. A23G 9/20
[52] U.S. Cl. ......................................... 62/136; 62/342
[58] Field of Search .......................... 62/136, 342, 306

[56] References Cited

U.S. PATENT DOCUMENTS

| | | | |
|---|---|---|---|
| 1,887,311 | 11/1932 | Kohr | 62/342 X |
| 2,556,510 | 6/1951 | Topping | 62/342 X |
| 3,180,104 | 4/1965 | Goetz | 62/136 |
| 3,797,268 | 3/1974 | Garavelli | 62/342 X |
| 3,823,571 | 7/1974 | Smith et al. | 62/136 |
| 4,093,055 | 6/1978 | Blackburn et al. | 192/116.5 |

FOREIGN PATENT DOCUMENTS 435622  5/1948  Italy ..................................... 62/342

Primary Examiner—William E. Tapolcai
Attorney, Agent, or Firm—Steele, Gould & Fried

[57] ABSTRACT

The present invention includes a counter top unit for dispensing the partially frozen beverage and, at one or more locations remote from that unit, two syrup supply canisters, a source of $CO_2$, and a condenser and compressor unit that provides refrigeration coolant to the counter top unit. Supply and return lines carry the refrigeration coolant between the counter top unit and the compressor/condenser unit. The counter top unit includes a compact housing that is adapted to be set on the counter top. Inside the counter top unit is a pair of cooling chambers. Each cooling chamber produces, holds and dispenses a partially frozen beverages. The cooling chamber includes agitators, that mix the partially frozen beverage, and cooling coils, that are coupled to the refrigerant supply and return lines, which cool the interior of the cooling chamber. Two pumps in the counter top unit mix the water and the syrups and the resulting mixtures are fed, along with a predetermined amount of $CO_2$, into respective ones of the cooling chambers. Preferably, water is first fed into a reservoir tank in the counter top unit and then is drawn from the tank by the pump/mixer. The counter top unit also includes a motor that continually rotates the agitators in each of the cooling chambers via respective torque transmission units. Refrigeration controls and product controls regulate the flow of refrigeration coolant, $CO_2$, water and syrup into the cooling chambers.

10 Claims, 3 Drawing Sheets

PARTIALLY FROZEN BEVERAGE DISPENSING SYSTEM HAVING A COUNTER TOP UNIT

BACKGROUND OF THE INVENTION

The present invention relates to a beverage dispensing system that dispenses a partially frozen beverage from a counter top unit. The drink is is a flavored, semi-liquid, semi-solid, (i.e., partially frozen) carbonated drink.

Customarily, the partially frozen beverage is dispensed from a machine that stands upright on a floor. U.S. Pat. No. 3,823,571 to Smith et al. discloses the principal components and the operation of one type of floor model dispensing unit. The disclosure in Smith et al. is incorporated herein by reference thereto.

The floor model dispensing unit includes all major components of the system including, among other things, the cooling chambers for producing the partially frozen beverage, pumps for mixing the flavored syrup and water, a motor for driving the agitators in the cooling chambers, and a compressor and a condenser for providing refrigeration coolant to the cooling chambers. The floor model is connected to an electrical power supply and a water supply. Generally, the floor model is considered to be a substantially self-contained system.

A problem arises in installing the floor model dispensing system in some stores because of the lack of available space. Particularly in pre-existing stores or in stores that place a high premium on floor space, it would be advantageous to utilize counter top space. Some counter tops have a depth (the dimension of the counter top normal to its front face edge) that is smaller than the depth of the floor model system. Therefore, the size of the existing model limits its use.

OBJECTS OF THE INVENTION

It is an object of the present invention to provide a system with a counter top dispensing unit that produces and outputs a partially frozen beverage.

It is a further object of the present invention to provide a dispensing unit that is compact and that sits on a counter top.

It is another object of the present invention to provide a counter top unit that includes major components in a special configuration such that the unit can fit on narrow counter tops.

It is an additional object of the present invention to provide a system with a counter top dispensing unit and a remotely disposed condenser and compressor unit that generates refrigeration coolant, a remotely disposed supply of syrups, and a remote supply of carbon dioxide (referred to herein as $CO_2$).

It is another object of the present invention to provide a compact arrangement for the components in the counter top unit.

SUMMARY OF THE INVENTION

The present invention includes a counter top unit for dispensing the partially frozen beverage and, at one or more locations remote from that unit, two syrup supply canisters, a source of $CO_2$, and a condenser and compressor unit that provides refrigeration coolant to the counter top unit. Supply and return lines carry the refrigeration coolant between the counter top unit and the compressor/condenser unit. The counter top unit includes a compact housing that is adapted to be set on the counter top. Inside the counter top unit is a pair of cooling chambers. Each cooling chamber produces, holds and dispenses a partially frozen beverage. The cooling chamber includes agitators, that mix the partially frozen beverage, and cooling coils, that are coupled to the refrigerant supply and return lines, which cool the interior of the cooling chamber. Two pumps in the counter top unit mix the water and the syrups and the resulting mixtures are fed, along with a predetermined amount of $CO_2$, into respective ones of the cooling chambers. Preferably, water is first fed into a reservoir tank in the counter top unit and then is drawn from the tank by the pump/mixer. The counter top unit also includes a motor that continually rotates the agitators in each of the cooling chambers via respective torque transmission units. Refrigeration controls and product controls regulate the flow of refrigeration coolant, $CO_2$, water and syrup into the cooling chambers.

BRIEF DESCRIPTION OF THE DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENT

The present invention relates to a partially frozen beverage dispensing system having a counter top unit.

Figure 1:
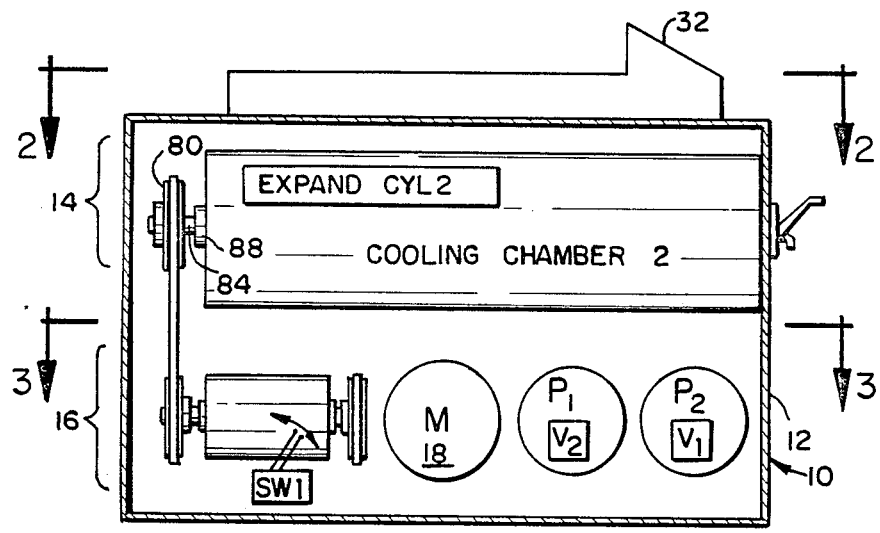
FIG. 1 is a diagrammatic side view of the counter top dispensing unit.

FIG. 1 diagrammatically illustrates a side view of counter top unit 10. Unit 10 includes a compact housing 12. Disposed within the interior of housing 12 is pump $P_1$ and pump $P_2$ Associated with each pump $P_1$ and $P_2$ is a respective valve $V_1$ and $V_2$. Motor M is also disposed in the interior of counter top unit 10.

Figure 2:
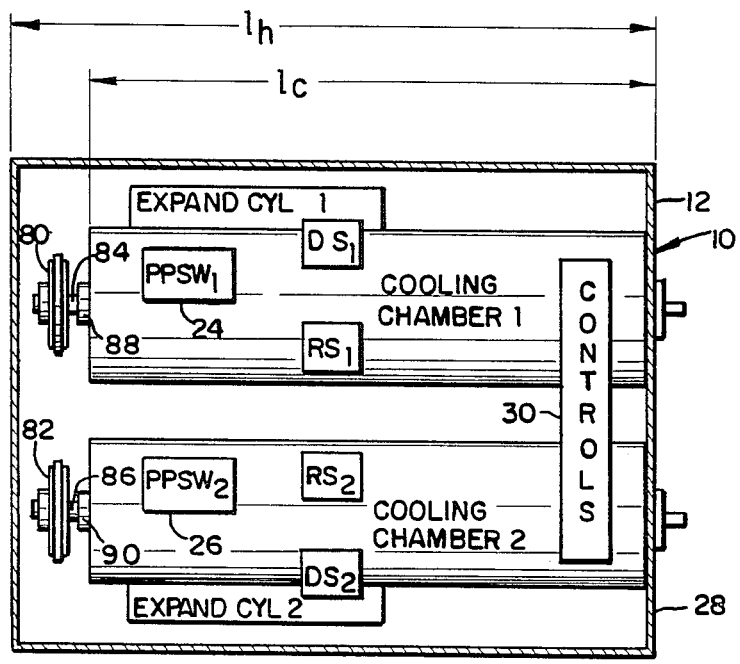
FIG. 2 is a diagrammatic top view of the counter top dispensing unit from the perspective of section line 2'—2" in FIG. 1.
Figure 3:
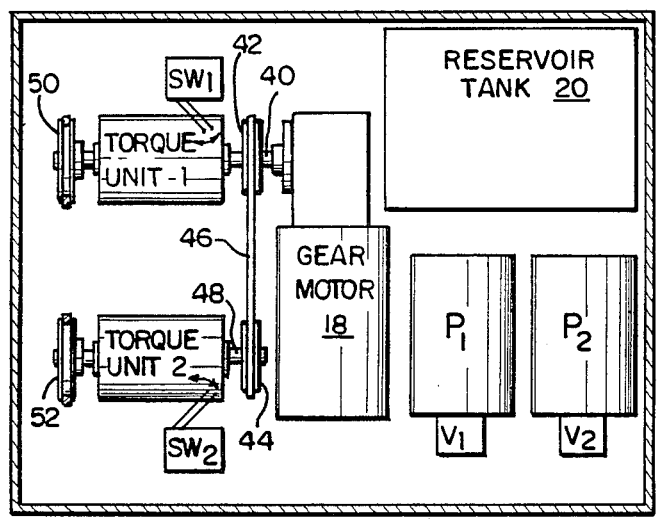
FIG. 3 is a diagrammatic cross-sectional view of the counter top unit from the perspective of section line 3'—3" in FIG. 1.

FIGS. 2 and 3 diagrammatically illustrate various cross-sectional views of the counter top unit. FIGS. 1, 2 and 3 will be referred to simultaneously herein. Cooling chambers 1 and 2 are mounted in an upper region 14 of the interior of housing 12. Expansion cylinders 1 and 2 are respectively strapped to chambers 1 and 2. Disposed in a lower region 16 of the housing are pumps $P_1$ and $P_2$, motor M, gear unit 18 and two torque transmission units each providing drive mechanisms to rotate agitator paddles in each of the cooling chambers. These agitator paddles will be described in greater detail with respect to FIG. 5. Switches $SW_1$ and $SW_2$ are part of the refrigeration controls that are described later. Also disposed in lower region 16 is a water reservoir tank 20.

Cooling chambers 1 and 2 are elongated cylinders having a length $l_c$. The length of the cylinders occupies almost all of the length $l_h$ of the counter top unit 10. Only a relatively small portion of the drive system in the rear region 22 of housing 12 extends beyond the length of the cooling chambers. In the prior art floor model, the torque transmission units are axially aligned with their respective cooling chambers and hence the length (or depth) of the floor model dispensing system is substantially greater than the length $l_h$ (i.e., the depth) of counter top unit 10. This reduction in length enables the counter top unit to be set on relatively small counter tops and, hence, be more versatile.

In order to accommodate the essential elements of the dispensing system into the counter top unit, pumps $P_1$ and $P_2$ have axial center lines that are generally normal to the axial center lines of cooling chambers 1 and 2. Similarly, motor M has an axial center line that is normal to the axial center lines of the cooling chambers. On the other hand, torque transmission units 1 and 2 have axial center lines that are substantially coplanar with the respective axial center lines of the cooling chambers.

Almost all of the controls for the counter top unit are disposed above the cooling chambers. With respect to cooling chamber 1, a product control switch sensor is generally disposed near the rear of the chamber. Control switch sensor 24 is a product pressure switch $PPSW_1$. As discussed later with respect to FIG. 5, the product pressure switch senses the pressure in the interior of cooling chamber 1 and generates a command signal that ultimately actuates pump $P_1$ and opens various solenoid valves controlling the flow of syrup to the pump and $CO_2$ to the mixing point. Also associated with cooling chamber 1 is refrigeration solenoid $RS_1$ and defrost solenoid $DS_1$. These solenoid valves will be discussed in detail with respect to FIG. 5. Cooling chamber 2 also has an associated switch sensor 24 which is, in a preferred embodiment, product pressure switch $PPSW_2$, refrigeration solenoid valve $RS_2$ and defrost solenoid valve $DS_2$. Towards the front panel 28 of counter top unit 10, is a control section 30. Control section 30 has on its angularly inclined face 32 (see FIG. 1) the following controls:

A master switch for the entire counter top unit;
A defrost cycle control motor driven timer;
Defrost indicator lights for both chambers;
Product control switches for both chambers;
Refrigeration control switches for both chambers.

In order to maintain the partially frozen carbonated beverage in a semi-liquid/semi-solid state, the agitators in the cooling chambers (shown in FIG. 5) must be continually rotated. The drive for these agitators originates at motor M. The gear unit 18 appropriately alters the rotative movement of the shaft of motor M and outputs the mechanical power on a shaft 40. Shaft 40 is coaxial with the axial center line of torque unit 1. A pulley wheel 42 is coupled to a second pulley wheel 44 via a belt 46. Pulley wheel 44 is on a shaft 48 that is coaxial wit the axial center line of torque unit 2. At the outputs of these torque units are pulley wheels 50 and 52, respectively. One type of torque transmission unit is described in U.S. Pat. No. 4,093,055 to Blackburn et al., and that patent is incorporated herein by reference thereto.

Figure 4:
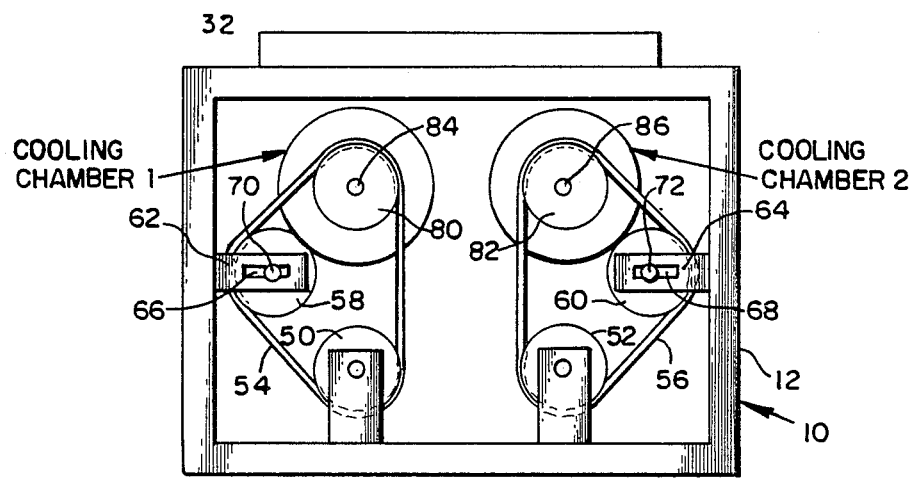
FIG. 4 is a diagrammatic rear view of the counter top unit.

FIG. 4 shows a diagrammatic rear view of counter top unit 10 and housing 12. Pulleys 50 and 52 respectively drive belts 54 and 56. These belts are maintained at a certain tension by idler wheels 58 and 60. The idler wheels are mounted on support bars 62 and 64. The support bars have slots 66 and 68 in them and idler wheels 58 and 60 are movable in the slots by loosening a bolt and nut combination or other mounting mechanism 70 and 72. Belts 54 and 56, respectively, drive pulley wheels 80 and 82 that are attached to rotatable shafts 84, 86 extending into the interior of cooling chambers 1 and 2. Therefore, the space occupied by rear section 22 of housing 12 (FIG. 2) need only accommodate drive pulley wheels 80 and 82, short extending shaft sections 84 and 86 and rear seals 88, 90 that seal the rotating shaft and the rear end of cooling chambers 1 and 2.

Since the agitator paddles in each of the cooling chambers are continually rotated during the operation of the chambers and since some type of sensing or monitoring mechanism must be utilized to determine when to shut off the flow of refrigeration coolant to each cooling chamber, associated with each torque unit is a switch that senses the amount of opposing torque or resisting torque applied by the partially frozen beverage on the paddles and shafts 84 and 86 and ultimately returned through the drive system back to the torque units. When the partially frozen beverage reaches a low temperature at which the mixture begins to freeze solid, the torque resistance increases and the respective switches $SW_1$ or $SW_2$ change states. The refrigeration control system reacts to the output of the switch. One type of torque unit is generally shown in U.S. Pat. No. 4,093,055 to Blackburn et al.

Figure 5:
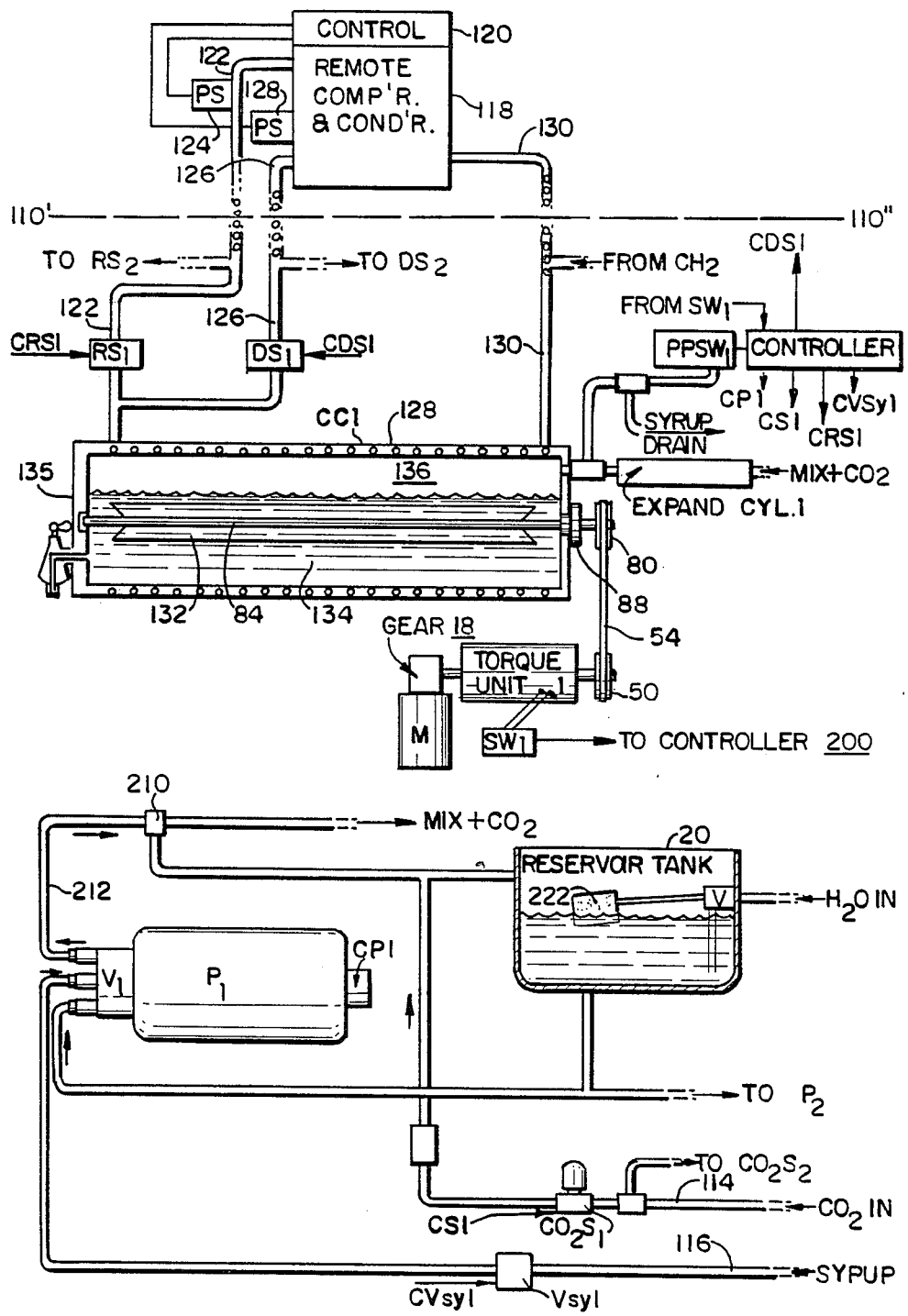
FIG. 5 is a partial schematic of the system.

FIG. 5 shows a partial schematic diagram of the partially frozen beverage dispensing system. The items above dashed line 110'—110" are at a remote location with respect to the counter top unit. The items below line 110'—110" are located inside the counter top unit. The FIG. is a partial schematic since the items associated with cooling chamber 2 are omitted. The system schematic in FIG. 5 shows input water line 112 from a source of water, $CO_2$ supply line 114 from a $CO_2$ source, and syrup line 116 leading from a source of syrup. It should be noted that the counter top unit includes another set of major components, for example a pump and another torque transmission unit, that are associated with chamber 2 but not shown in the figure.

With respect to the remotely disposed items, functional block 118 represents a compressor and a condenser unit. The compressor and condenser unit is controlled by a control unit 120. Control unit 120 senses the pressure in refrigerant supply line 122 via a pressure sensor 124. Control unit 120 also senses the pressure in defrost hot gas line 126 via pressure sensor 128. The refrigerant and/or hot defrost gas is returned to compressor/condenser unit 118 via return line 130. The refrigerant supply line 122, hot gas defrost supply line 126 and return line 130 extend from the remote location to the counter top unit, that is, across dashed line 110'—110". Cooling chamber 1 is designated as CC1 in FIG. 5. The cooling chamber includes coils or passages that are fluidly or gaseously coupled to refrigerant supply line 122 and defrost hot gas line 126. One of these passages is shown as a coil 128. Refrigeration coolant is supplied to these cooling coils via refrigerant solenoid valve $RS_1$. Hot defrost gas is supplied to the cooling chamber via defrost solenoid $DS_1$. The coolant and gas returns to the remotely located compressor/condenser unit 118 via the return line 130 exiting the rear end of cooling chamber 1. In the interior of cooling chamber 1 is one or more agitator paddles that are diagrammatically illustrated as paddle 132 in FIG. 5. The paddle is mounted onto shaft 84 that extends from the front wall 135 of cooling chamber 1 out through rear seal 88 to pulley wheel 80. The shaft is continually rotated as described above.

The partially frozen beverage produced and held in cooling chamber 1 is shown by the shaded area 134 in FIG. 5. A $CO_2$ cushion is noted in the top interior section 136 of cooling chamber 1. The product is dispensed from the cooling chamber via dispensing valve 138 at front end 135 of the cooling chamber. The condition of the product in the interior of the cooling chamber is sensed by sensor/switch 24. In this embodiment, the pressure is sensed by product pressure switch PPSW1. An output signal is generated by PPSW1 and sent to controller 200. Controller 200 generates the following control signals for chamber 1:

| Signal | Function |
| --- | --- |
| CP1 | controls pump $P_1$ |
| CRS1 | controls refrigerant solenoid valve $RS_1$ |
| CS1 | controls $CO_2$ solenoid valve $CO_2S_1$ |
| CVSY1 | controls syrup solenoid valve $V_{syl}$ |
| CDS1 | controls defrost solenoid valve $DS_1$ |

Controller 200 conditions the signal from PPSW1 and generates the necessary signals to operate the system. Generally, when PPSW1 indicates that product 134 in cooling chamber 1 is low, the mixing pump 1 is turned on, the solenoid valve $CO_2S_1$ is opened, thereby permitting the flow of $CO_2$ to mixing point 210, and the syrup solenoid valve $V_{syl}$ is opened, permitting the flow of syrup from the source of syrup to flow to valve $V_1$ on pump $P_1$. Pump $P_1$ draws water from reservoir tank 20 and mixes the syrup and the water in the appropriate ratio and outputs the resulting mixture into line 212 upstream of mixing point 210. After the $CO_2$ is mixed with the syrup/water mixture at mixing point 210 (which is a means for mixing), the resulting carbonated mixture is delivered to expansion cylinder 1. Expansion cylinder 1 permits the the $CO_2$ in the mixture to expand before entering the cooling chamber thereby enabling a greater amount of product 134 to be input into the chamber.

Since motor M continually rotates agitator paddles 132 in cooling chamber 1, torque unit 1 continually senses the torque resistance of product 134 in the cooling chamber. When the torque resistance, sensed by torque unit 1, increases beyond a predetermined level, switch $SW_1$, which in a preferred embodiment is a microswitch, changes state and a signal is sent to controller 200. The controller then issues control signal CRS1 to solenoid valve $RS_1$ and the valve closes thereby stopping the flow of refrigeration coolant through refrigerant supply line 122 and into cooling passages 128 of the cooling chamber 1. Torque unit 1 still senses the torque resistance and $SW_1$ again changes state when the resistance falls below a predetermined value. An appropriate signal is sent which ultimately results in the opening of refrigerant solenoid valve $RS_1$ and the resumption of the flow of refrigeration coolant from refrigerant supply line 122 back into cooling passages 128.

When refrigerant solenoid valve $RS_1$ is opened, pressure sensor 124, connected to refrigerant supply line 122 at the remote location, senses the drop in pressure and control unit 120, coupled to remote compressor and condenser unit 118, is activated thereby turning on the compressor/condenser. Hence, there is no control or command signal exchanged between the counter top unit and the remotely disposed elements.

The defrost cycle is periodically activated dependent upon the amount of time $RS_1$ is open. During the time $RS_1$ is open, a circuit in controller 220 stops a timer that effects the defrost cycle. Therefore, at predetermined times subject of course to the opening of $RS_1$, the defrost cycle is activated to defrost the interior of cooling chamber 1. For example, the defrost cycle may occur every four hours in order to inhibit the freezing of cooling chamber. At those predetermined times, CDS1 is applied to defrost solenoid valve $DS_1$ thereby permitting the flow of hot gases via defrost supply line 126 to be sent to cooling passages 128 of cooling chamber 1. It should be noted that controller 200 also controls cooling chamber 2 and its associated components.

Controls 30 in FIG. 2 include various indicators and switches for the operation of the system as listed above. The master switch for the counter top unit is the master control for the unit. The timing sequence for the defrost cycle is generally preset but the operator can vary that preset time within a specific range with the defrost cycle control. The defrost cycle ON indicator lights indicate when the chamber is in the defrost cycle, i.e., when defrost solenoid valve $DS_1$ is open. The product control switches for cooling chambers 1 and 2 permit the operator to override PPSW1 and PPSW2 and fill the respective cooling chamber with product. The refrigerant control switches for cooling chambers 1 and 2 generally provide an override for supplying refrigerant/coolant to the respective cooling chambers by overriding the control signal generated by controller 200 and permitting the flow of refrigeration coolant to the respective cooling chamber.

It has been found that the counter top unit operates effectively at distances of up to 100 feet from remote compressor and condenser 118. The syrup supply coupled to syrup supply line 116 can be up to 500 feet from the remote counter top unit. The distance to the $CO_2$ supply is not an important criteria to the operation of the counter top unit. No control signals are sent to those sources. Water to the counter top unit is supplied via water supply line 112. Valve 220 is actuated by float 222 such that when float 222 drops to a specific level, valve 220 opens and water from water supply line 112 is fed into reservoir tank 20 via line 224.

The claims appended hereto are meant to cover modifications and changes within the scope and spirit of the invention.

What is claimed is:

1. A counter top unit for partially frozen beverage dispensing system having at one or more locations remote from said counter top unit, means for supplying water, means for supplying $CO_2$, means for supplying syrup, and means for providing refrigeration coolant via refrigerant supply and return lines running to said counter top unit, the unit adapted to be set on a counter top and comprising:

a compact housing adapted to be set on said counter top and having in its interior:
at least two cooling chamber means, disposed in an upper region of said housing, for producing, holding and dispensing said partially frozen beverage each said cooling chamber means including agitation means for mixing said partially frozen beverage in an interior of said cooling chamber means, and each said cooling chamber means including means for cooling, coupled to said refrigerant supply and return lines, said interior of said cooling chamber means;
respective means for fluidly mixing said water and said syrup and delivering the resulting mixture to a corresponding one of said cooling chamber means, said means for fluidly mixing coupled to said means for supplying water and said means for supplying syrup;

respective means for mixing said $CO_2$ with said resulting mixture prior to delivery to said corresponding one of cooling chamber means, said means for mixing said $CO_2$ coupled to said means for supplying $CO_2$;

a motor means, disposed below said two cooling chamber means, for rotating a corresponding one of said agitation means via a respective torque transmission means, each said respective torque transmission means disposed immediately below a corresponding one of said cooling chamber means;

respective refrigeration control means, coupled to a corresponding one of said torque transmission means, for controlling the flow of said refrigeration coolant through said refrigerant supply line based upon a predetermined condition of said agitation means;

product control means for sensing a condition of said partially frozen beverage held in each said cooling chamber means and for coincidently controlling the flow of said $CO_2$ from said means for supplying said $CO_2$, for controlling the flow of said syrup from said means for supplying said syrup, and for activating said respective fluid means for mixing.

2. A counter top unit as claimed in claim 1 wherein said means for supplying syrup supplies two syrups, each said means for fluidly mixing includes means for pumping that is controlled by said product control means and is disposed below said two cooling chamber means.

3. A counter top unit as claimed in claim 2 wherein said predetermined condition is a torque requirement for rotating the corresponding agitation means in each cooling chamber means.

4. A counter top unit as claimed in claim 3 wherein said motor means includes a drive means for imparting rotational movement to each said respective torque transmission means.

5. A counter top unit as claimed in claim 3 wherein each said respective torque transmission means has a central axis and each said cooling chamber means is an elongated cylinder having a corresponding axial center line, and wherein the central axis of each said respective torque transmission means is generally coplanar with the corresponding axial center line of the respective cooling chamber means.

6. A counter top unit as claimed in claim 3 wherein each said respective refrigeration control means includes a refrigeration solenoid valve means for controlling the flow of refrigerant coolant to the corresponding cooling chamber means.

7. A counter top unit as claimed in claim 6 wherein each said product control means includes a respective pressure sensor means for sensing the pressure in the respective cooling chamber means and is located above said cooling chamber means.

8. A counter top unit as claimed in claim 3 wherein said cooling chamber means are elongated cylinders generally occupying the entire length of said compact housing.

9. A counter top unit as claimed in claim 3 including a water reservoir tank means for holding water, said tank means intermediately coupled between said means for supplying water and said tank means located below said cooling chamber means.

10. A counter top unit as claimed in claim 9 wherein said tank means includes a float valve means for controlling the flow of water input into said tank means form said means for supplying water dependent upon the amount of water in said tank means.

* * * * *